United States Patent [19]

Auslender et al.

[11] 4,121,086
[45] Oct. 17, 1978

[54] METHOD FOR IRRADIATION OF ROUND-SECTION CYLINDRICAL OBJECTS WITH ACCELERATED ELECTRONS

[76] Inventors: Vadim Leonidovich Auslender, Morskoi prospekt, 15, kv. 24; Gersh Itskovich Budker, ulitsa Maltseva, 6; Georgy Borisovich Glagolev, Morskoi prospekt, 7, kv. 11; Anatoly Alexandrovich Livshits, Morskoi prospekt, 1, kv. 21, all of Novosibirsk; Vitaly Petrovich Perepelkin, ulitsa Lobachevskogo, 10, kv. 60, Moscow; Vladimir Arkhipovich Polyakov, ulitsa Maltseva, 1, kv. 27, Novosibirsk; Lev Vladimirovich Chepel, Tokmakov pereulok, 3, kv. 38, Moscow; Ilya Lvovich Chertok, Morskoi prospekt 16, kv. 11; Vladimir Georgievich Cheskidov, ulitsa Rubinovaya, 5, kv. 34, both of Novosibirsk, all of U.S.S.R.

[21] Appl. No.: 795,722

[22] Filed: May 11, 1977

[30] Foreign Application Priority Data

May 12, 1976 [SU] U.S.S.R. ............... 2359068[I]

[51] Int. Cl.² ............................................. B23K 9/00
[52] U.S. Cl. ............................................. 219/121 EM
[58] Field of Search ............... 219/121 EB, 121 EM

[56] References Cited

U.S. PATENT DOCUMENTS

| 3,394,217 | 7/1968 | Fisk | 219/121 EB X |
| 3,440,392 | 4/1969 | Erlandson et al. | 219/121 EB |
| 3,622,679 | 11/1971 | Kennedy | 219/121 EB X |

FOREIGN PATENT DOCUMENTS

| 1,393,518 | 12/1964 | France | 219/121 EB |
| 199,653 | 8/1967 | U.S.S.R. | 219/121 EB |

*Primary Examiner*—J. V. Truhe
*Assistant Examiner*—Fred E. Bell
*Attorney, Agent, or Firm*—Lackenbach, Lilling & Siegel

[57] ABSTRACT

A method for irradiation of round-section cylindrical objects, such as pipes, with accelerated electrons, whereby three objects are placed together in the area of intersection of three ribbon or strip electron beams directed at an angle of 120° to one another. The objects in the intersection area are positioned so that the centers of the cross sections thereof coincide with the apices of an imaginary equilateral triangle, and each side of the imaginary triangle being normal to the direction of one of the electron beams, and the length of each side is equal to at least two diameters of an object. The width of each ribbon beam is not less than a triangle side length plus the diameter of an object.

3 Claims, 3 Drawing Figures

METHOD FOR IRRADIATION OF ROUND-SECTION CYLINDRICAL OBJECTS WITH ACCELERATED ELECTRONS

The present invention relates to methods of radiation treatment of various objects, and more particularly to methods of irradiation with accelerated electrons of round-section objects, such as plastic pipes, to improve their performance.

Known in the art is a method for irradiation of round-section cylindrical objects with accelerated electrons, whereby objects are treated with two oppositely directed flat or strip (ribbon) beams. However, when objects are irradiated from two sides, uniform irradiation essential for most practical purposes cannot be achieved.

Also known (see U.S. Pat. No. 2,741,704) is a method for irradiation of round-section cylindrical objects with accelerated electrons, whereby objects are placed in an area of intersection of three ribbon electron beams directed at an angle of 120° to one another.

This method generates a uniform irradiation which is required for most practical purposes, but it is found rather inefficient when the radiation yield is restricted not by the power of the electron accelerator used as the source of radiation, but by the rate of feeding objects into the irradiation area, which is or may be determined, for example, by the manufacturing rate or by deterioration of the strength properties of the treated objects, resulting from overheating thereof during irradiation. For instance, in the manufacture of plastic pipes, with an absorbed dose of 20 Mrad, which is maximum or optimum for modification by radiation of most plastic polyolefine-based materials and with a throughput of 60 to 90 kg/hr, typical of currently used extruders, the actual power of the electron beam is only 3 to 5 kW, which is by one order below that developed by modern electron accelerators.

The principal object of the present invention is to provide a means for enhancing the efficiency of radiation in a method for irradiation of round-section cylindrical objects with accelerated electrons, when the rate of their movement is limited.

Another object of the invention is to increase the capacity of the apparatus for irradiation of round-section cylindrical objects with accelerated electrons.

These objects are accomplished by providing a method for irradiation of round-section cylindrical objects with accelerated electrons, whereby three objects are, according to the invention, placed together in an area of intersection of three ribbon electron beams at an angle of 120° to one another so that the centers of the cross-sections of the objects coincide with apices of an imaginary equilateral triangle, each side of which is normal to the direction of one of the beams and has a length at least equal to two diameters of the cross-section of said object, the width of each beam being not less than a triangle side length plus the diameter of said object.

To provide for uniform irradiation of each object in all of the three directions, it is preferable that the current density across each sheet beam be increased over a stretch opposite the gap between objects positioned on a respective side of the triangle.

The invention will now be described in greater detail with reference to a preferred embodiment thereof, taken in conjunction with the accompanying drawings, wherein.

Figure 1:
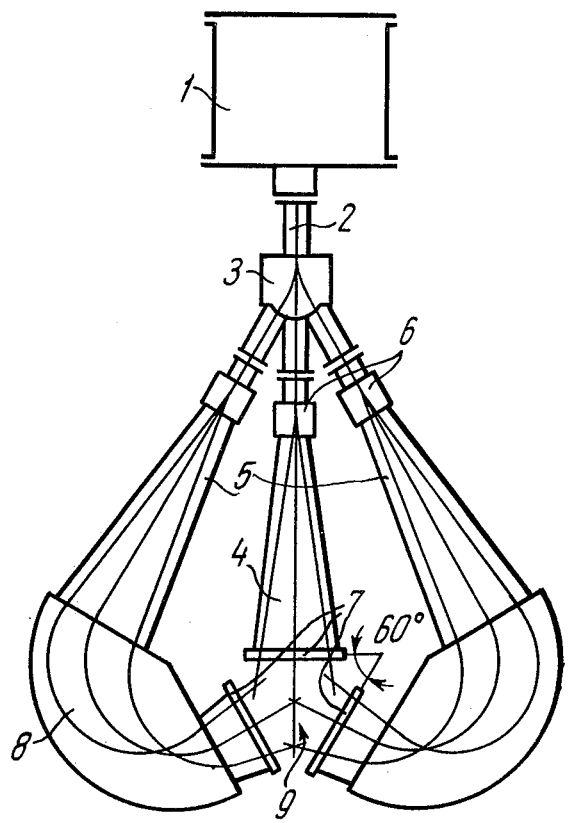
FIG. 1 shows schematically an embodiment of the present method for irradiation of round-section cylindrical objects with accelerated electrons.

Referring now to FIG. 1, the arrangement embodying the present invention comprises an electron accelerator 1 of any suitable design, preferably a pulse source of electrons, and an electron beam guide 2 which connects the accelerator 1 to a magnetic electron beam distributor 3 serving to distribute the electron beam between a central channel 4 and two side channels 5. A magnetic sweep circuit 6 is provided at the inputs of each channel 4 and 5. Each channel 4 and 5 terminates in an exit port 7. In addition, each side channel incorporates a magnetic beam deflecting system 8. The output ports 7 arranged at 60° to one another define an irradiation area 9.

Figure 2:
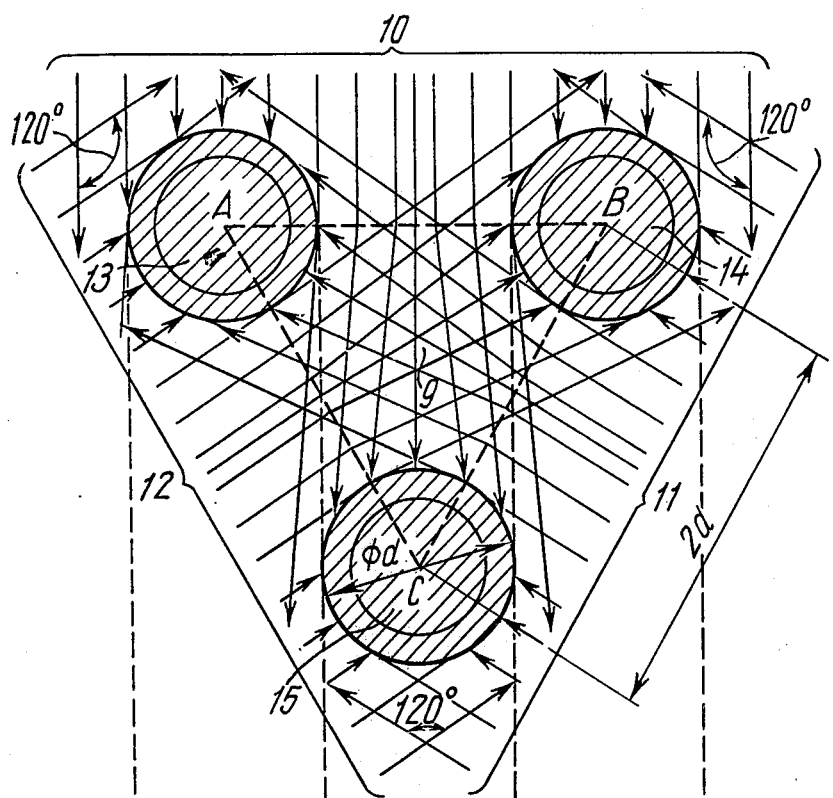
FIG. 2 is an enlarged schematic view of an irradiation area.

The arrows in FIG. 2 indicate the directions of three ribbon beams 10, 11 and 12 which are at 120° to one another in the irradiation area 9. The diagram also shows cross sections of three objects 13, 14 and 15 in the irradiation area 9, each having a diameter "$d$".

Figure 3:
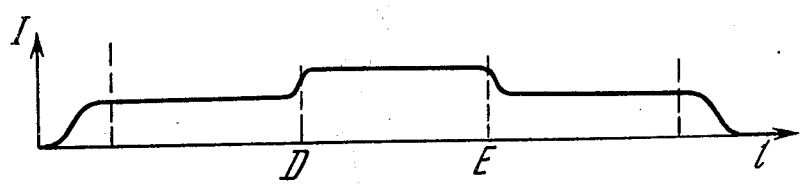
FIG. 3 is a diagram showing the distribution of the electron current density along a ribbon beam.

Presented in FIG. 3 is a diagram showing the density distribution of electron current 1 (plotted on the Y-axis) along ribbon beam width "$l$" (plotted on the X-axis).

The arrangement operates as follows. A beam of accelerated electrons emitted by the accelerator 1 (FIG. 1) passes along the electron guide 2 and reaches the magnetic distributor 3 which directs the beam successively into the three channels 4 and 5. In the central channel 4, the electron beam is expanded in one plane by the magnetic sweep circuit 6 and given a ribbon shape as it leaves the port 7.

As the beam is travelling along each side channel 5, the magnetic sweep circuit 6 expands the beam, and the magnetic deflecting system 8 turns the beam before it leaves the port 7.

The magnetic deflecting systems 8 provide for two sheet beams 12 and 11 (FIG. 2) coming out of the side channels 5 (FIG. 1) at an angle of 120° to each other and to the sheet beam 10 (FIG. 2) emitted through the central channel 4 (FIG. 1).

Thus, the irradiation area 9, in the arrangement of this invention, is formed by the three sheet beams 10, 11 and 12 intersecting one another at 120°.

According to the present invention, the method for irradiation of round-section cylindrical objects 13, 14 and 15 (FIG. 2) resides in the following.

The three round-section cylindrical objects 13, 14 and 15 are arranged in the irradiation area 9 so that the axes or centers of their cross sections coincide with the apices of an imaginary equilateral triangle ABC, wherein each side AB, BC and CA is normal to the direction of one of the beams 10, 11 or 12, and has a length equal to at least two diameters "$d$" of an object. Width "$l$" of each beam 10, 11 and 12 is at least equal to the length of a side of the triangle ABC plus the diameter "$d$" of each object 13, 14 and 15. FIG. 2 illustrates an example when $BA = BC = CA = 2d$, and $l = 3d$. In order that each object 13, 14 and 15 should be irradiated uniformly on three sides, the density of current I (FIG. 3) distributed across each beam is increased (in this case, by about 30 percent) over a portion DE (FIG. 2) opposite the gap between the irradiated objects 13 and 14 positioned on the respective side AB of the triangle ABC, whereby a drop in the radiation intensity in the sectors of the objects turned toward the center of the area 9 is compensated by electron scattering.

With the objects 13, 14 and 15 arranged position in the area of intersection of the three ribbon or sheet beams 10, 11 and 12 (irradiation area 9), the exposure dose is reduced about three times due to a decrease in the current density on the surfaces of the irradiated objects 13, 14 and 15. Hence, the objects 13, 14 and 15 can be fed to or moved into the irradiation area 9 at a limited rate. In addition, the power of the electron accelerators can be increased three-fold, with the result that the efficiency of the radiation unit incorporating the above accelerator is improved, and the cost of manufacture is cut down because the cost of the accelerator increases nonlinearly with the beam power.

What is claimed is:

1. A method for irradiation of equally-sized round-section cylindrical objects using accelerated electrons, whereby an irradiation area is formed by directing three ribbon electron beams at an angle of 120° to one another, comprising the step of placing in said irradiated area three said objects to provide the same irradiation condition to each by arranging that the centers of the cross sections of said objects coincide with the apices of an imaginary equilateral triangle, each side of said imaginary triangle is normal to the direction of one of said electron beams and has a length equal to at least two diameters of the cross section of said object, and the width of each said electron beam is not less than a triangle side length plus the diameter of said object; whereby the exposure dose is reduced about three times due to a decrease in the current density on the surfaces of said objects.

2. A method for irradiation of round-section cylindrical objects as claimed in claim 1, whereby the current density across each said beam is increased over a section opposite the gap between said irradiated objects positioned on a respective side of said imaginary triangle, so that any drop in radiation intensity or decrease in the absorbed portion, of the sectors of said irradiated objects facing the center of said imaginary triangle due to the scattering of electrons is thereby compensated by the increased density.

3. A method for irradiation of equally-sized round-section cylindrical objects using accelerated electrons, as set forth in claim 1, wherein said three objects are simultaneously placed in said irradiated area so as to provide the same irradiation condition to each of said three objects.

* * * * *